United States Patent

Farr et al.

[11] Patent Number: 6,099,655
[45] Date of Patent: *Aug. 8, 2000

[54] WET CHEMICAL PROCESS FOR REMOVING AN ABRASIVE ALUMINA SEAL TOOTH COATING

[75] Inventors: Howard J. Farr, Blue Ash; Jeffrey A. Bauer, Cincinnati, both of Ohio; D Sangeeta, Niskayuna, N.Y.

[73] Assignee: General Electric Company, Cincinnati, Ohio

[*] Notice: This patent is subject to a terminal disclaimer.

[21] Appl. No.: 08/888,301

[22] Filed: Jul. 8, 1997

Related U.S. Application Data

[63] Continuation-in-part of application No. 08/578,802, Dec. 26, 1995, Pat. No. 5,685,917.

[51] Int. Cl.$^7$ ....................................................... B08B 3/10
[52] U.S. Cl. ......................... 134/2; 134/19; 134/22.13; 134/22.14; 134/29; 164/132
[58] Field of Search ..................... 134/2, 19, 22.13, 134/22.14, 22.19, 29; 164/132; 216/101; 252/79.1

[56] References Cited

U.S. PATENT DOCUMENTS

| | | | |
|---|---|---|---|
| 4,317,685 | 3/1982 | Ahuja et al. | 134/2 |
| 4,439,241 | 3/1984 | Ault et al. | 134/22.17 |
| 5,464,479 | 11/1995 | Kenton et al. | 134/1 |
| 5,643,474 | 7/1997 | Sangeeta | 134/2 |
| 5,685,917 | 11/1997 | Sangeeta | 134/2 |

*Primary Examiner*—Jill Warden
*Assistant Examiner*—Saeed Chaudhry
*Attorney, Agent, or Firm*—Andrew C. Hess; Gerry S. Gressel

[57] ABSTRACT

A wet chemical process for removing an abrasive oxide coating from the surface of a rotating turbine engine component, such as a tooth that forms a rotating air seal with a complementary sealing member. The process generally entails subjecting the coating to a caustic solution at an elevated pressure. The caustic solution is preferably a mixture of water and a base, such as sodium or potassium hydroxide, with the addition of an organic compound being a preferred constituent in a sufficient amount as a solvent media for the caustic solution. A suitable caustic solution contains the base and water at a ratio of about one to one (1:1). If present, the organic compound may constitute about one to about ninety-eight weight percent of the solution. The process is preferably carried out in an autoclave charged with the caustic solution. Under an elevated pressure and preferably an elevated temperature, the caustic solution is capable of completely removing an alumina seal tooth coating without damaging an underlying bond coat or the tooth substrate.

10 Claims, No Drawings

WET CHEMICAL PROCESS FOR REMOVING AN ABRASIVE ALUMINA SEAL TOOTH COATING

CROSS REFERENCE TO RELATED APPLICATIONS

This is a continuation-in-part patent application of U.S. patent application Ser. No. 08/578,802, filed Dec. 26, 1995 now U.S. Pat. No. 5,685,917.

FIELD OF THE INVENTION

This invention pertains to processes for removing an oxide coating from the surface of a substrate. More particularly, this invention is related to a process for removing an abrasive aluminum oxide coating on a seal tooth of a rotating air seal, such as that of a gas turbine engine, so as to permit inspection of the air seal components and/or replacement of the oxide coating.

BACKGROUND OF THE INVENTION

Turbofan gas turbine engines employ high and low pressure turbines that drive a high pressure compressor and low pressure compressor, respectively. The turbines and their compressors are interconnected by a concentric pair of shafts, the outer shaft typically interconnecting the high pressure turbine and compressor while the inner shaft interconnects the low pressure turbine and compressor. During engine operation, the two shafts both rotate but at different speeds relative to each other, necessitating shaft bearings therebetween. It is also necessary to confine the liquid lubricant used for the shaft bearings to a volume immediately surrounding the bearings, and at the same time prevent excessive amounts of cooling air to flow into that volume of lubricating liquid.

Due to the high temperatures and relatively high rotational speeds of the shafts, often exceeding thousands of revolutions per minute, conventional contacting seals between the shafts are inappropriate. Consequently, labyrinth seals, which comprise a plurality of array of radially-projecting seal teeth, are used between the two shafts. Typically, the teeth are mounted on or are integral with one of the shafts and project toward the other shaft, such that the teeth and an area of the other shaft swept by the teeth form a rotating air seal. The teeth and shafts are manufactured and assembled to minimize the radial gap therebetween and thereby promote the effectiveness of the air seal. As a result, some degree of rubbing between the teeth and the area swept by the teeth occurs during the initial operation of the engine due to manufacturing tolerances, differing rates of thermal expansion and dynamic effects. However, direct rubbing contact between the teeth and the shaft tends to abrade the teeth, which further increases the radial air seal gap and shortens the useful life of the labyrinth seal. As such, it is well known in the art to form an abrasive aluminum oxide (alumina) coating on the teeth and an abradable material on the area of the shaft swept by the teeth. The alumina coating is typically adhered to the teeth with a bond coat, typically a nickel-aluminum alloy. Abrasive alumina coatings have found wide use as being capable of surviving in the hostile environment of a gas turbine engine, and therefore able to protect the teeth during numerous rub encounters that occur during in-service operation of the engine.

In addition to being subject to wear from rub encounters, alumina seal teeth coatings are susceptible to damage from erosion and attack from environmental contaminants. Consequently, replacement of the coating is eventually required. In addition, the alumina coating must also be removed on occasion to permit inspection of the underlying teeth, which can crack, oxidize and erode as a result of the hostile operating environment of a gas turbine engine. Because alumina is extremely chemically resistant and cannot be removed using conventional stripping chemicals at room temperature and pressure, the repair of alumina seal teeth coatings has generally required removal by mechanical means, such as abrasive blasting or by waterjet. Thereafter, the underlying bond coat is removed using known etchants.

A disadvantage with this process for removing alumina coatings is that the geometry of the teeth is such that blasting is difficult and coating removal is frequently incomplete. Incomplete removal of the coating prevents complete removal of the underlying bond coat, compromising replacement of the bond coat and inspection of the teeth. Furthermore, if abrasive blasting is used, abrasive grit entrapped in the surfaces of the teeth can cause a reduction in the fatigue life of the teeth and the air seal. Consequently, the teeth must be carefully masked to ensure that only the alumina coating is subjected to the force of the abrasive grit blast. However, masking must be precisely performed to achieve suitable results, and some seal geometries significantly increase the difficulty, and therefore the cost, of removing the abrasive alumina coating.

Thus, it would be desirable to provide a process for removing an abrasive coating, and particularly an abrasive alumina labyrinth seal coating, that achieves removal of the coating without damage to the underlying substrate, is relatively rapid and compatible with turbine component processing methods, and can be used regardless of substrate geometry.

SUMMARY OF THE INVENTION

This invention is directed to a wet chemical process for removing an abrasive oxide coating from the surface of a turbine engine component, such as a seal tooth of a rotating air seal. The process is particularly suitable for removal of an alumina seal tooth coating to enable replacement of the coating and/or inspection of the underlying seal tooth. The process of this invention generally entails subjecting the coating to a caustic solution at an elevated pressure. The caustic solution is preferably a mixture of water and a base, such as sodium or potassium hydroxide, with the addition of an organic compound being a preferred constituent when present in a sufficient amount as a solvent media for the caustic solution. A suitable caustic solution contains the base and water at a ratio of about one to one (1:1). If present, the organic compound may constitute about one to about ninety-eight weight percent of the solution.

The process of this invention is preferably carried out in an autoclave charged with the caustic solution. Under an elevated pressure and preferably an elevated temperature, the caustic solution is capable of completely removing an alumina seal tooth coating, thereby facilitating later removal of any underlying bond coat such as by conventional chemical methods. Notably, the process is able to remove an alumina coating without damaging the bond coat or underlying substrate.

From the above, it can be seen that an advantage of the invention is that an abrasive oxide seal tooth coating can be stripped without damaging the underlying bond coat and tooth substrate, thereby eliminating the masking requirement necessitated by prior art blasting techniques. The absence of abrasive materials in the process of this invention also enables multiple repairs to the teeth of a labyrinth seal, since the seal substrate is not eroded or otherwise damaged by the process. Consequently, there is a substantial savings in the time and cost to refurbish a seal tooth coating or inspect the seal teeth. Also due to the avoidance of abrasive grit, the fatigue life of the seal teeth is not prone to being limited by abrasive particles entrapped in the teeth surface. Another advantage of the invention is that the caustic treatment of this invention can be performed in a closed system using recyclable chemicals.

Other objects and advantages of this invention will be better appreciated from the following detailed description.

DESCRIPTION OF THE INVENTION

The present invention provides a wet chemical process for removing an oxide coating from a component, such as an abrasive alumina coating of a seal tooth that, in cooperation with an abradable complementary sealing member, forms an air seal between two rotating components of a gas turbine engine. The process is suitable for removing such a coating to allow replacement of the coating or permit inspection of the underlying seal tooth substrate. The process does not damage or affect a bond coat used to adhere the coating to the seal tooth, nor the tooth substrate.

Bond coats for seal tooth coatings are usually metallic compositions, including diffusion aluminides and MCrAlY, where M is nickel, cobalt and/or iron. Substrate materials often used for seal teeth and other components of gas and steam turbine engine components include cast or wrought nickel, chromium or iron-base alloys and superalloys. Examples of such alloys are GTD-111, GTD-222, René 80, René 41, René 125, René 77, René 95, Inconel 706, Inconel 718, Inconel 625, cobalt-based HS188, cobalt-based L-605, and stainless steels. While the present invention will be discussed with particular reference to gas turbine engine components formed from superalloys, the process of this invention can also be applied to other substrate materials and components in a variety of applications, such as marine environments, electronic applications, and power generators, such as gas, steam and nuclear, to mention a few.

The process of this invention entails using an autoclave with a caustic solution to fully remove the alumina coating, as well as any other oxides, dirt and organic impurities present on the seal tooth. The term "dirt" includes sand, volcanic ash, fly ash, cement, runway dust, substrate impurities, fuel and air sources, oxidation products from engine components, and the like. In addition to the alumina coating, oxides may be derived from environmental contaminants that adhere to the tooth during service. Such oxides include those of calcium, magnesium, aluminum, silicon, chromium, iron, nickel, barium, titanium, alkali metals, and mixtures thereof. Other surface contaminants that can be removed by the process of this invention include vanadates, sulfates, and phosphates of alkali metals.

The caustic solution of this invention is generally a mixture of a base and water, with or without an organic compound as a solvent. Examples of preferred base constituents are sodium hydroxide, potassium hydroxide, ammonium hydroxide, lithium hydroxide, triethylamine (TEA), tetramethylammonium hydroxide (TMAH), and mixtures thereof. Examples of suitable organic compounds are alcohols such as methanol, ethanol, propanol, isopropyl alcohol and acetone, liquid carbon dioxide, liquid ammonia, and mixtures thereof. The addition of heat-resistant surface-active agents may also be used to improve wetting properties of the solution, and therefore the speed at which the solution is able to strip the coating. Suitable agents for this purpose are known in the art.

The base constituent and water are preferably present in the solution at a ratio of about one to one. However, the concentration of the base in the solution may range from very dilute, e.g., about one weight percent, to very concentrated, e.g., about sixty-five weight percent. The organic compound is preferably present in a sufficient amount as a solvent media for the caustic solution to fully wet and then remove the alumina coating from the tooth surface. The relative amounts of base, water and organic compound also depend on the size of the autoclave reactor and the size of the part being processed. Commonly known engineering principles can be used to calculate various amounts of the organic compound that is sufficient with the base constituent and water to promote removal of a seal tooth coating. A solution found to work well to remove abrasive alumina coatings contains about twenty weight percent sodium or potassium hydroxide, about twenty weight percent water, and about sixty weight percent ethanol.

As is known in the art, autoclave reactors are pressure vessels capable of operating at high pressures and temperatures. Pressure in an autoclave can be elevated by heating its contents or by using an external source of compressed gases to over-pressurize the vessel. With the process of this invention, an autoclave may be operated in batch fashion, that is, the ingredients of the caustic solution are charged, the unit is closed, and the charge is brought to the desired conditions of temperature and pressure. Alternatively, continuous or semicontinuous operation can be undertaken if one or more of the caustic solution constituents are continuously fed and products continuously withdrawn from the autoclave.

In the autoclave, the temperatures and pressure that are applied may cause the organic compound of the caustic solution to become a supercritical fluid or have properties similar to that of a supercritical fluid. Herein, the term "supercritical fluid" means that the surface tension of the fluid is zero or approaches zero, promoting the ability of the caustic solution to completely wet surfaces that it contacts. The caustic solution does not have to be a supercritical fluid for removal of alumina seal tooth coatings in accordance with this invention. However, as the organic compound of the caustic solution approaches a supercritical state in the autoclave reactor, the surface tension of the solution is dramatically reduced thus enhancing the activity of the caustic solution and its wettability toward the surface of the tooth.

The temperature, pressure and treatment duration for the process of this invention can vary, depending on the thickness of the oxide coating to be removed and the capabilities of the autoclave reactor. To be effect, the caustic solution must be maintained at an elevated pressure. Pressures found to be useful are in the range of about 80 to about 1300 psi (about 5.5 to about 89.6 bar), though higher pressures could be used. The lower pressure level can be achieved at room temperature with pressurized air typically available on industrial processing lines. As noted above, higher pressures can be achieved by heating the autoclave. A particularly suitable temperature range is about 150° C. to about 250° C., with a temperature and pressure combination found to be particularly useful being about 250° C. and about 1300 psi (about 89.6 bar). Higher pressures and temperatures can generally be applied to achieve shorter process times. Furthermore, the process can start with zero pressure and, by increasing the temperature of the reaction mixture, the autoclave pressure automatically rises resulting from the increase in the vapor pressure of the reaction mixture. The treatment duration generally depends on the amount of coating to be removed and the temperature and pressure conditions that are applied. A suitable duration is generally about 0.1 to 8.0 hours. Also, it should be noted that using a mixer, such as a mechanical stirrer, magnetic stirrer or ultrasonicator, at low or high pressures may enhance the ability of the caustic solution to remove the coating on geometrically complex surfaces.

As an example of a caustic autoclave treatment performed in accordance with this invention, an abrasive alumina coating was removed from the teeth of a labyrinth air seal using a caustic solution containing about twenty weight percent sodium hydroxide, about twenty weight percent water and about sixty weight percent ethanol at a temperature of about 250° C. and a pressure of about 1050 psi. The seal teeth were not masked to protect adjoining surface regions not covered by the oxide coating. The processing time was about two hours at the elevated temperature. Following removal from the autoclave, inspection of the labyrinth seal evidenced that the coating was completely and cleanly removed without damaging a nickel-aluminum bond coat beneath the alumina coating and without damage to the underlying seal substrate.

While the invention has been described in terms of a preferred embodiment, it is apparent that other forms could be adopted by one skilled in the art. Accordingly, the scope of the invention is to be limited only by the following claims.

What is claimed is:

1. A wet chemical process for removing an abrasive alumina seal tooth coating adhered to a substrate by a bond coat, the process comprising the step of subjecting the seal tooth coating to a caustic solution, the caustic solution comprising about 1 to about 98 weight percent of an organic solvent, about 1 to about 65 weight percent of a base and the balance water, the caustic solution being maintained at an elevated pressure and temperature for a duration sufficient to completely remove the seal tooth coating from the substrate, the organic solvent being selected from the group consisting of methanol, ethanol, propanol, isopropyl alcohol, acetone, liquid carbon dioxide, liquid ammonia, and mixtures thereof.

2. A process according to claim 1, wherein the base is selected from the group consisting of sodium hydroxide, potassium hydroxide, ammonium hydroxide, lithium hydroxide, triethylamine, tetramethylammonium hydroxide and mixtures thereof.

3. A process according to claim 1, wherein the base and water are present in the caustic solution at a ratio of about 1:1 organic solvent selected from the group consisting of methanol, ethanol, propanol.

4. A process according to claim 1, wherein the caustic solution further comprises a heat-resistant surface-active agent that improves wetting properties of the caustic solution.

5. A process according to claim 1, wherein the caustic solution consists essentially of about twenty weight percent sodium or potassium hydroxide, about twenty weight percent water, and about sixty weight percent ethanol.

6. A process according to claim 1, wherein the substrate is a seal tooth of a gas turbine engine labyrinth air seal.

7. A process according to claim 1, wherein the elevated pressure is at least about 80 psi.

8. A process according to claim 1, wherein the temperature is about 150° C. to about 250° C.

9. A method according to claim 1, wherein the bond coat is a metal composition selected from the group consisting of diffusion aluminides and MCrAlY.

10. A method according to claim 1, wherein the substrate is a nickel, chromium or iron-base superalloy.

* * * * *